United States Patent
Hegde et al.

(10) Patent No.: US 10,447,778 B2
(45) Date of Patent: Oct. 15, 2019

(54) SYNCHRONIZING PEER NODES OF A MULTI-CHASSIS SWITCHING CLUSTER

(71) Applicant: Extreme Networks, Inc., San Jose, CA (US)

(72) Inventors: Ramachandra Hegde, Karnataka (IN); Vinay Gurusimha, Karnataka (IN)

(73) Assignee: Extreme Networks, Inc., San Jose, CA (US)

( * ) Notice: Subject to any disclaimer, the term of this patent is extended or adjusted under 35 U.S.C. 154(b) by 230 days.

(21) Appl. No.: 14/690,315

(22) Filed: Apr. 17, 2015

(65) Prior Publication Data

US 2016/0308962 A1  Oct. 20, 2016

(51) Int. Cl.
*H04L 29/08* (2006.01)

(52) U.S. Cl.
CPC ............................ *H04L 67/1095* (2013.01)

(58) Field of Classification Search
CPC . H04L 67/1095; H04L 1/1867; H04L 1/1877; H04L 45/00
USPC .......... 709/217, 224, 237; 370/338, 395.21; 714/748
See application file for complete search history.

(56) References Cited

U.S. PATENT DOCUMENTS

| | | | | |
|---|---|---|---|---|
| 4,617,657 A * | 10/1986 | Drynan | ................. | H04L 1/1628 370/394 |
| 5,519,704 A * | 5/1996 | Farinacci | ............ | H04L 12/1868 370/402 |
| 6,574,668 B1 * | 6/2003 | Gubbi | ................... | H04L 1/1614 709/231 |
| 2005/0036497 A1 * | 2/2005 | Kawakami | ............ | H04L 1/1877 370/395.21 |
| 2006/0215624 A1 * | 9/2006 | Adya | .................... | H04W 8/005 370/338 |
| 2009/0154356 A1 * | 6/2009 | Wiemann | .............. | H04L 1/1809 370/236 |
| 2009/0158388 A1 * | 6/2009 | Sridhar | ............... | H04L 41/0604 726/2 |
| 2009/0228602 A1 * | 9/2009 | Speight | .................... | H04L 1/18 709/236 |
| 2010/0257420 A1 * | 10/2010 | Chen | ..................... | H04L 1/1867 714/748 |
| 2010/0281163 A1 * | 11/2010 | Shi | ......................... | H04L 45/00 709/224 |

(Continued)

OTHER PUBLICATIONS

George, RFC4165, Sep. 2005, Network Working Group, https://www.ietf.org/rfc/rfc4165.txt (Year: 2005).*

*Primary Examiner* — Zi Ye
(74) *Attorney, Agent, or Firm* — Sterne, Kessler, Goldstein & Fox P.L.L.C.

(57) ABSTRACT

Implementations generally relate to synchronizing peer nodes in networks. In one embodiment, a method includes generating a data sequence number. The method also includes associating the data sequence number with a data item. The method also includes sending the data item and the data sequence number to each peer node of a plurality of peer nodes. The method also includes determining if an acknowledgment has been received from each peer node, wherein each acknowledgment indicates the peer node that sent the acknowledgment and indicates the data sequence number. The method also includes resending the data item and the data sequence number to one or more peer nodes based on a predetermined policy.

20 Claims, 5 Drawing Sheets

(56) References Cited

U.S. PATENT DOCUMENTS

| | | | |
|---|---|---|---|
| 2013/0329580 A1* | 12/2013 | Missett | H04L 43/0835 370/252 |
| 2014/0133289 A1* | 5/2014 | Jadav | H04L 43/0811 370/216 |

* cited by examiner

SYNCHRONIZING PEER NODES OF A MULTI-CHASSIS SWITCHING CLUSTER

BACKGROUND

Communication networks are widely used to provide communication between different computer systems and other electronic devices. Wireless communication networks offer increased convenient access to client devices, such as computers, phones, and other devices, by allowing network communications between these devices without the need for wired connections. Conventionally, a protocol such as transmission control protocol (TCP) is used for one-to-one synchronization of two peer nodes in a communication network.

DETAILED DESCRIPTION

Implementations described herein facilitate synchronization of peer nodes of a multi-chassis cluster in networks. In various implementations, the peer nodes are all the member nodes belonging to one multi-chassis switching cluster. In various implementations, synchronization of peer nodes of a multi-chassis cluster is based on a connectivity fault management (CFM) protocol. Implementations apply to layer 2 device/switch or any device that performs layer 2 functionality. In one embodiment, a peer node in the cluster generates a data sequence number. The peer node then associates the data sequence number with a data item. The peer node then sends the data item and the data sequence number to other peer nodes of a plurality of peer nodes in the cluster. The peer node determines if an acknowledgment has been received from each peer node in the cluster, where each acknowledgment indicates the peer node that sent the acknowledgment and indicates the data sequence number. As described in more detail below, acknowledgement implementations are unique in that a single message functions as an acknowledgement for multiple peer nodes. The peer node resends the data item and the data sequence number to one or more other peer nodes based on a predetermined policy. For example, the predetermined policy may entail resending the data item and the data sequence number to a particular node if an acknowledgment from the given particular node is not received within a predetermined time period. In another example, the predetermined policy comprises resending the data item and the data sequence number to a particular peer node in response to receiving a request for the data item from the particular peer node. These example policies are described in more detail below.

Figure 1:
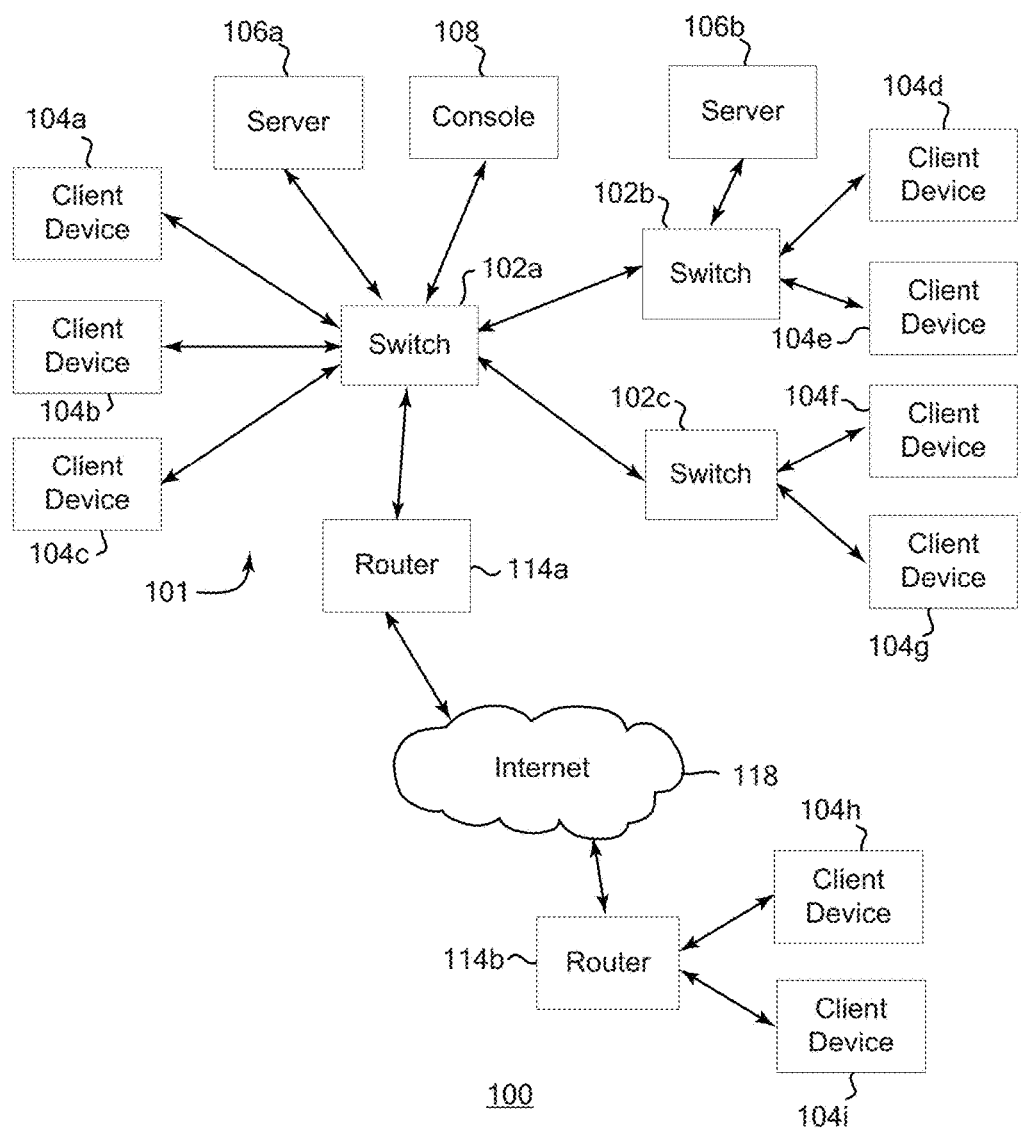
FIG. 1 illustrates a block diagram depicting an example network environment, which may be used to implement some implementations described herein.

FIG. 1 is a block diagram of an example network system 100, which may be used to implement some implementations described herein. The network system 100 may include a network 101 providing communication links between multiple devices connected to the network. Network 101 may be any type of network that connects devices, such as a wide area network (WAN), local area network (LAN), wireless network, or others types of networks. Any of various networking standards can be used for network 101, such as Ethernet.

Network system 100 may include peer nodes such as switches 102 to connect various other devices to each other and to allow them to communicate via the network communication links. Switches 102 may also be referred to as switches 102a, 102b, and 102c. In various implementations, switches 102a, 102b, and 102c function as the peer nodes of the multi-chassis cluster denoted by 102. Also, the terms peer nodes and switches 102 may be used interchangeably.

In the example of FIG. 1, client devices 104a, 104b, and 104c and server 106a are connected to switch 102a. Client devices 104d and 104e and server 106b are connected to switch 102b. Client devices 104f and 104g are connected to switch 102c.

Each peer node or switch 102 is a network device, which is referred to herein as a controller for the network, and which enables devices to communicate with each other over the network. Each switch 102 may include various types of devices as a switch, router, bridge, or hub. In some implementations, switches 102 can be managed switches, allowing commands to modify the operation of the switch. Furthermore, a single switch 102 as shown in FIG. 1 can represent one or more switches, such as a switch stack. A switch 102 includes a number of connections or ports, where each communicating device on the network can be connected to a port of the switch. Some implementations of a switch 102 allow multiple network devices to be connected to a single port of a switch 102. The switch manages the data communications between each device connected to it, such as sending data from one client device to a different client device or to a server that is the intended destination of the sender. In some implementations, a switch 102 can be connected to one or more other switches 102. For example, in FIG. 1, switch 102a is connected to switch 102b and to switch 102c. Multiple switches can be connected in the network system 100 to provide additional ports, locate ports in different physical areas, provide backup functionality, aid troubleshooting and testing, and/or provide other functions.

Each client device 104 and server device 106 can be any of a variety of types of devices. For example, in some implementations, client devices 104 and/or servers 106 can be implemented as desktop computers, laptop computers, tablet computers, portable devices, cell phones, media players, entertainment devices (television, disc player, stereo), mainframe computer, peripherals (printer, scanner, sensors), or other electronic devices.

Some implementations can use one or more of the servers 106 and/or client devices 104 as a repository for data and/or logs collected by the switches 102. For example, server 106a can provide storage for data collected by switch 102a, and server 106b can provide storage for data collected by switch 102b. Some implementations can provide dedicated storage associated with each switch 102. For example, a switch 102 may include internal storage, or may be connected to dedicated storage for the switch via a separate communication interface.

In some implementations, one or more switches 102 can be connected to another type of network device such as routers 114. In some examples, router 114*a* can interface the network 101 with one or more other networks. For example, the router 114*a* can be connected to a WAN such as the Internet 118, which is in turn connected to a network 118 via a router 114*b*. In one example, router 114*b* can be a wireless router including a switch network device that is connected to client devices 104*h* and 104*i*. For example, router 114*a* can forward any data from client devices 104 or servers 106 on network 101 via the Internet 118 to router 114*b* and client devices 104*h* and/or 104*i*. Likewise, router 114*a* can receive data intended for client devices 104 or server 106 on network 101 from the Internet 118, originating from network 118 or other source. Communication links of the networks that handle greatly increased traffic between network nodes, such as between different networks, can be considered trunk lines or trunk paths.

In some implementations, one or more of the switches 102 can be connected to a console 108. Console 108 can be any electronic device, such as a device similar to a client device 104, that allows a system administrator or other user to directly connect to the switch 102 to read status and other data from the switch 102 as well as provide instructions or commands to configure and control the operation of the switch 102. In some embodiments, the console 108 is connected to the switch via a serial port, Universal Serial Bus (USB) connection, or other type of interface that is not a connection of the network 101. Some implementations allow any of the client devices 104 to act as a console and provide console functions, using the network 101 as a connection to the intended switch 102.

Network devices such as switches 102 and/or routers 114 can be provided with functionality described herein to autonomously perform network tasks, as described in greater detail below. In some implementations, multiple such network devices of the network system 100 can be provided with this functionality and used to collect data and control functions at different nodes and connections of the network. In some implementations, different network devices can be instructed to perform different types of network tasks.

According to various implementations described herein, peer nodes in the cluster autonomously perform network tasks. If any one peer node becomes inactive, other peer nodes in the cluster can take over tasks of the inactive peer node. These tasks include actions or operations of the network device that relate to activity on the network. For example, such activity can be data sent and received at the ports of the network device, and/or the states of components of the network device that are associated with occurring network activity. The activity can be responses or activity of other devices connected to the network. In some implementations, network tasks can generally be of two types: data collection and control. For either data collection or control tasks, the network device can operate as an autonomous device according to features described herein.

Data collection (or data gathering) can be used in troubleshooting, testing, and general network monitoring uses. One example of a data collection network task is to have the network device monitor data traffic on the network and collect the results of the monitoring. Received instructions can, for example, instruct the router to count packets or other data units per time unit. In some implementations, the network device can monitor data passing through the ports of the network device and collect relevant statistical data about the data traffic. This can be performed directly by the network device itself with no need to use the network connections, thus providing more reliable monitored data due to no restrictions from other data traffic, as well as freeing up bandwidth on the network for other uses. In some implementations, a network device can determine and monitor data flowing through other ports or connections of the network. For example, some types of network devices can send out test data to particular ports or connections and determine when a response is returned, thus indicating bandwidth or other characteristics of ports on other network devices. A network device can store, or can be instructed to store, collected data to one or more particular data repository storage devices, such as a client device or server over the network or storage included in or directly accessible by the network device. In some examples, if no repository is specified, then a default repository storage device can be used.

Another example of a data collection task is capturing state information from the network device. This captured data can be sent to and stored in a data repository. The state information can be related to network activity. In some examples, the current CPU utilization of the network device can be monitored by the network device itself. Similarly, the current utilization of memory on the network device can be monitored by the network device. For example, the network device can determine how much memory is free, how much memory has been allocated, the size of blocks of memory, the extent of fragmentation in memory, etc. Furthermore, the state information can include port states (e.g., enabled or disabled), and interface up/down status. State information can also include current information stored in tables of the network device, which can be examined by the network device and values captured and stored. Such tables can include routing tables (e.g., in a router) holding values indicating routes to different network destinations. MAC address tables can also be examined, which hold MAC addresses indicating which devices are active on and connected to the network, and allowing the identity of the connected devices to be determined. The MAC addresses can also indicate where in the network the particular machines are connected. An address resolution protocol (ARP) table can also be examined and its values captured, to find information linking MAC addresses to Internet protocol (IP) addresses and to determine corresponding network activity. Protocol states handled by the network device can also be monitored and collected, e.g., transaction states for such protocols as open shortest path first (OSPF), routing information protocol (RIP), virtual router redundancy protocol (VRRP), spanning tree protocols (STP), link layer discovery protocol (LLDP), link aggregation control protocol (LACP), virtual LACP (VLACP), etc. Other device states including indicator light status or other readout status of the network device can also be captured. Overall, the data collection tasks can take snapshots of network devices and network activity, including the tables described above, routing activity, port enable and data traffic statistics, and other information for historical analysis of network activity and network growth planning.

Another type of network task is a control network task. These tasks cause the network device to perform an action or utilize a function of the network device, which can be related to network activity. In some cases the controlled network device function may affect other components of the network. A control network task allows hardware control to a user without an external device or host having to send commands to the network device to perform the control functions.

One example of a control network task is enabling and disabling ports of the network device to enable or disable data communication via those ports. This can be performed for a variety of different functions and results. For example, ports can be enabled and disabled to perform testing of the network device, testing of other network devices, and/or testing of connections in the network. In one testing example, the network device can enable and disable one or more of its ports as a testing stimulus to test its own functionality and characterize its own behavior in response to the execution of network tasks.

In another testing example, a different, second network device can be tested by controlling one or more functions of the first network device. For example, the first network device can bounce port states by enabling and disabling one or more of its ports as a testing stimulus for the second network device. The enabling and disabling of ports can also force network path connectivity changes and/or trunk path changes for one or more other network devices, and/or force execution of port state changes (e.g., enables and disables) on one or more other network devices. The network device can also or alternatively be controlled to toggle protocol states in signals such as by sending, receiving, and acknowledgment states in protocols such as open shortest path first (OSPF), routing information protocol (RIP), virtual router redundancy protocol (VRRP), or other protocols to test the responses of the second switch. Repeated bouncing of port states or protocol states can be used to exercise network device behavior and test event recovery of both the instructed network device as well as other network devices.

In one example, multiple connections are used from a first switch to a second switch to test spanning tree reconvergence on the second switch. In a spanning tree reconvergence procedure, if a network connection changes or is disabled, the network controllers determine which network paths to use such that there are no redundant paths and looped paths in the network. In one scenario, ports are enabled and disabled in a testing procedure on the first switch to test the reactions of the second switch in the convergence procedure. For example, one port from the first switch is allowed to forward data traffic and the other ports are blocked or disabled. By executing a control network task to then disable the forwarding port, the transition on the second switch to another link into forwarding can be tested. Control network tasks can instruct or schedule the first switch to perform disables on a series of ports on itself, and during these disables, the blocked ports on the first switch are monitored to find state transitions to forwarding by the second switch. A subsequent set of network tasks to reenable the disabled ports can then test the transition back to the original forwarding and blocked states. These control network tasks can be repeated for a number of cycles, such that extensive testing is performed for the second switch. For example, the behavior of the second switch can be captured by a series of scheduled data collections of the spanning tree state, and this data can be uploaded to a repository such as a server for later analysis by a system administrator or other user.

Control network tasks can also be used to perform fault isolation on a network. For example, a control network task can disable ports of the switch to isolate particular portions of the network from other portions, allowing the isolated portion and/or non-isolated portion to be used and/or tested without the influence of the other portion.

Some implementations can use control network tasks to control connectivity of the network, such as for security purposes. For example, there may be connections into the network that have availability only during certain times. A scheduled network task can instruct one or more switches to control the access to those connections by enabling and disabling appropriate ports of the switches at appropriate times. In some implementations, a control network task can instruct one or more switches to disable particular ports while backups or other system activities are being performed on the network.

The network device can also be instructed in some implementations to enable or disable power output on its ports. For example, a network device can be instructed via control tasks to turn on or off the power provided on its ports to other specified devices connected to its ports, such as power over Ethernet (PoE) devices that receive at least a portion of their operating power over the network connections. Some implementations can also use control tasks to change the priority of ports under particular conditions, such as which ports have priority to receive power when system power goes too low.

Control tasks can also be used to turn on or off the use of particular network communication protocols by the network device, and/or toggle or change protocol states, such as transaction states. Other features of the network device can be similarly turned on or off using control network tasks.

The data derived from network tasks such as data collection tasks and/or control tasks can be stored in a repository accessible to a system administrator or other user. For example, a user need only connect and download data from the repository to display desired network data at a console or management client device. For data collection tasks, the collected data describing the monitored network activity can be sent to the repository for storage. For control tasks, data indicating one or more results of the control tasks can be stored, such as indications of success or failure and/or related data.

The network tasks of the network device can be performed according to predetermined conditions that may have been instructed by a user. For example, such conditions can include time conditions, such as times to perform tasks as listed in a schedule. Other types of conditions may also be used to trigger particular network tasks. Some examples of conditions are described in greater detail below.

Scheduling of network tasks, for example, can allow periodic sampling of data traffic and device states across days, weeks, or months at specified time intervals with a number of samples being taken. Collected statistical data of network activity can be used for peak time study of traffic flows, monitoring of switch or stack memory usage and CPU utilization, or any other command-line interface available information such as routing table states and protocol states. For example, in a troubleshooting scenario, there may be a need to gather data and share that data with engineering for problem analysis. That data may need to be collected on a timed basis to see if there are particular times of day where network usage patterns change or otherwise contribute to the problem. By scheduling data collection at a timed interval, the switch becomes its own data collection platform without concern for the availability of resources at the physical site of the network. Scheduling can also be used to allow periodic control of network device functions. For example, the power on particular ports of the network device can be scheduled to be turned off at periodic times, such as on weekends.

A software application stored in a memory or computer-readable storage medium provides instructions that enable a processor to perform these functions and other functions described herein.

Although embodiments described herein are described in the context of several peer nodes, one of ordinary skill in the art will readily recognize that there could be any number of peer nodes in a cluster.

In various implementations, the system provides a connectivity fault management (CFM) maintenance domain (MD) that spans all of the peer nodes of the multi-chassis cluster. The system provides up maintenance endpoints (UP MEPs) on a special purpose inter-cluster virtual local area network (VLAN) on all peer nodes. In some implementations, the system uses an interswitch trunk (IST)/virtual interswitch trunk (VIST) to connect peer nodes. As described in more detail below, the system extends CFM messaging capability by introducing new type-length-value messages (TLVs) for reliably synchronizing data (e.g., updates) among the peer nodes of the peer cluster. As described in more detail below, the new TLVs provide data sequence numbering for tracking data items that are synchronized among the peer nodes. Implementations embed reliability in CFM messaging using sequence numbering wherever required.

Figure 2:
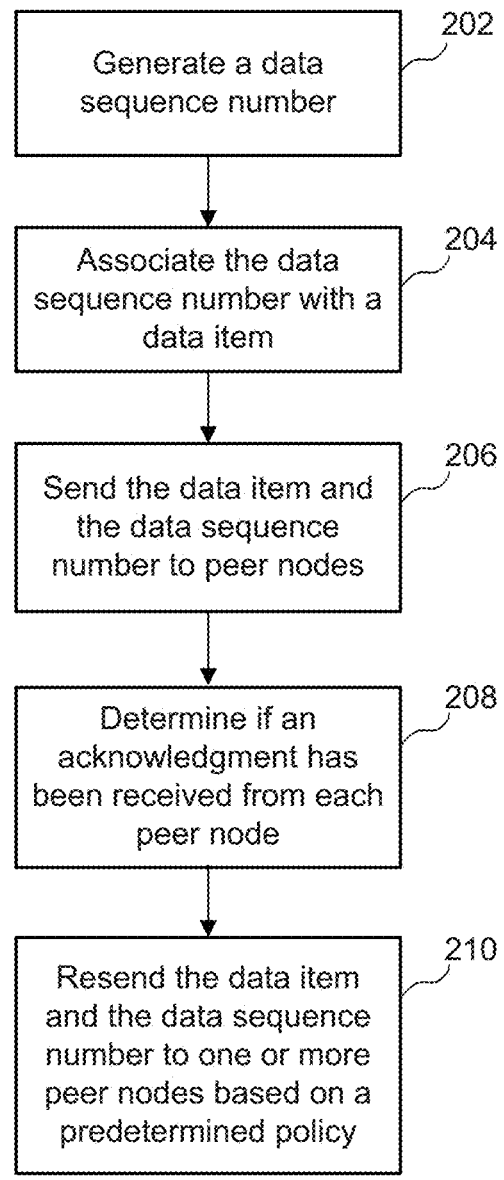
FIG. 2 illustrates an example simplified flow diagram for synchronizing peer nodes of a multi-chassis cluster in networks, according to some implementations.

FIG. 2 illustrates an example simplified flow diagram for synchronizing peer nodes of a multi-chassis cluster in networks, according to some implementations. As described in more detail below, in various implementations, a given peer node in a cluster of peer nodes sends a data item as a part of a synchronization process. In various implementations, the peer node multicasts the data item to other peer nodes, where the data item may be an update that is synchronized across the cluster of peer nodes.

Referring to both FIGS. 1 and 2, the method is initiated in block 202, where a peer node of network system 100 generates a data sequence number. In various implementations, the peer node generates the data sequence number as a part of generating a data type-length-value message (TLV) to be multicast in order to cluster-synchronize data to all other peer nodes. In various implementations, the peer node may use a CCM multicast capability to transmit cluster synchronization messages to other peer nodes in the cluster.

For ease of illustration, in some implementations described herein, a single data sequence number for a single data item is described. These implementations and others may also apply to multiple data sequence numbers for multiple respective data items. As described in more detail below, in various implementations, a given peer node may generate data sequence numbers to sequence originated data items, acknowledge received data items from other peers of the cluster, and track lost data items.

In various implementations, the data sequence number is generated to be sent in a continuity check message (CCM). The data sequence number is a part of a new TLV, which is different from a standard CCM sequence number. A standard CCM sequence number may be used for health checks. A data sequence number is used to confirm whether a particular data item has been received by each peer node of a peer cluster.

In block 204, the node associates the data sequence number with a data item. In various implementations, the data item is an update that originates at one peer node and that is synchronized across the cluster of peer nodes. The peer node at which the data item originates may be referred to as an originator peer node. Each peer node may be an originator of data items (e.g., updates). Such updates, for example, may include changes in MAC address, internet group management protocol (IGMP) group, VLAN membership, port up/down events, etc.).

In block 206, the node sends the data item and the data sequence number to each peer node in the cluster. In various implementations, the node sends the data item and the data sequence number based on a connectivity fault management (CFM) protocol. In various implementations, the node sends the data sequence number in a TLV message.

In block 208, the node determines if an acknowledgment has been received from each peer node of the cluster. In various implementations, each acknowledgment indicates the peer node that sent the acknowledgment and indicates the data sequence number. Even if a peer node has no new information (e.g., data, updates, etc., to be sent), that peer node should still acknowledge what data items it has received.

In various implementations, the receipt of both the data sequence number associated with the data item and receipt of an indication of the peer node that sent the acknowledgement confirms that the peer node that sent the acknowledgement has received the data item.

In block 210, the node resends the data item and the data sequence number to one or more peer nodes based on a predetermined policy. As indicated above, the node initially multicasts the data item to the peer nodes of the cluster. As described in more detail below, when resending the data item, the node unicasts the data item to each peer node as needed. In various implementations, the peer node may use a loop back messaging (LBM) unicast capability for any point-to-point unicast communication within the same MD or in the same maintenance association (MA) on the same VLAN.

In various implementations, a policy for resending a data item may entail the peer node unicasting the data item to one or more other peer nodes if a given peer node does not acknowledge a data item. In an example implementation, the peer node may determine if an acknowledgment from the given particular peer node is not received within a predetermined time period. If not received within a predetermined time period, the peer node resends (unicasts) the data item and the data sequence number to the given peer node. Sending a unicast message with the data item to particular peer nodes that have not acknowledged receipt of the original data item is more efficient that multicasting messages with the data item to all peer nodes. Implementations where an originator peer node unicasts the missing data sequence to one or more other peer nodes may be referred to as a push method. Implementations involving the push method are described in more detail below.

In various implementations, a policy for resending a data item may entail the peer node unicasting the data item to one or more other peer nodes in response to receiving a request for the data item from the particular peer node. In an example implementation, peer nodes track missing data sequence numbers. Each missing data sequence number may be an indicator of loss (a missing data item). As such, a peer node that detects a missing data sequence number then requests the missing data item/sequence from the originator peer node. Implementations where peer nodes are requesting a missing data item from the originator peer node may be referred to as a pull method. Implementations involving the pull method are described in more detail below.

In various implementations, the peer node generates a list of data sequence numbers of other peer nodes of the cluster, where the list includes the data sequence number of the latest data item sent out from each peer node in the cluster.

Figure 3:
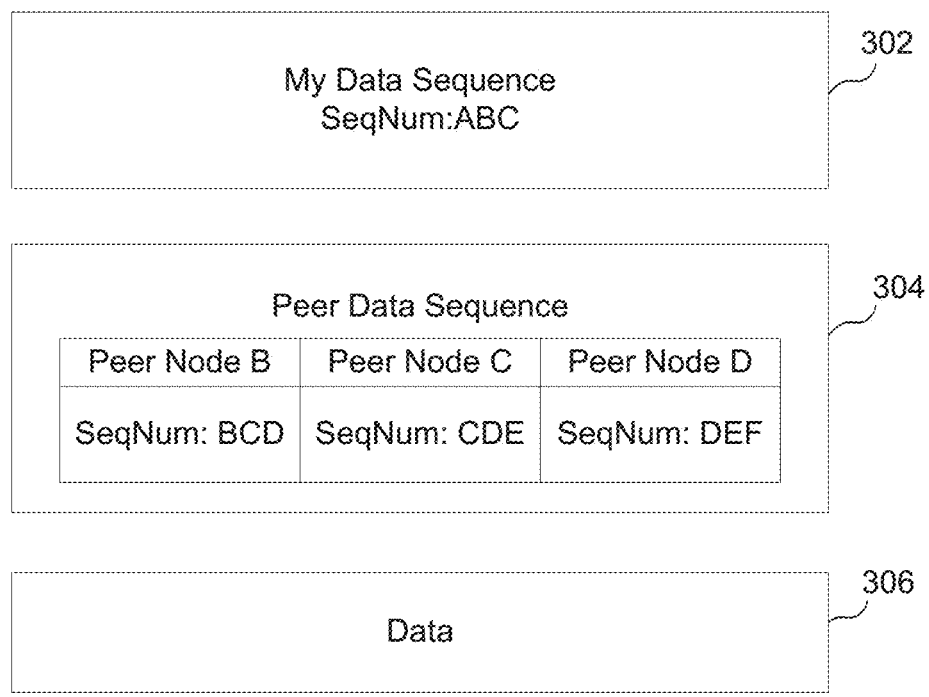
FIG. 3 illustrates block diagrams depicting example message components, which may be used to implement some implementations described herein.

FIG. 3 illustrates block diagrams depicting example message components, which may be used to implement some implementations described herein. FIG. 3 shows a data sequence 302 (labeled "MY DATA SEQUENCE") or MDS data sequence. Also shown is a peer data sequence 304 (labeled "PEER DATA SEQUENCE") or PDS data sequence. Also shown is a data item 306 (labeled "DATA"). In various implementations described herein, data sequence 302 and peer data sequence 304 are TLVs used for reliable cluster synchronization.

In various implementations, data sequence 302 includes a data sequence number ("SeqNum") ABC. In various implementations, a data sequence number may also be referred to as an MDS data sequence number. An MDS data sequence number is a data sequence number used by a particular node to track its own data that it originated being sent to with other peer nodes.

As described in more detail below, FIG. 3 involves a multi-chassis cluster with peer node A, peer node B, peer node C, and peer node D, where peer node A as the originator node of the messages described. In this example, the sequence number ABC (or MDS data sequence number) is used to sequence the data item originated by peer node A. In this example, peer node A is originating the data and syncing the data to peer node B, peer node C, and peer node D. In various implementations, each data item is associated with a unique data sequence number for tracking purposes, which will be described in more detail below.

In various implementations, peer data sequence 304 lists of all of the peer nodes that are part of the same peer cluster. Peer data sequence 304 also includes data sequence numbers associated with other peer nodes, or peer data sequence numbers. In various implementations, a peer data sequence number may also be referred to as an PDS data sequence number. A PDS data sequence number is a data sequence number used by a particular node to track data that it has received from other peer nodes (e.g., data originated by other peer nodes).

In this example, peer node A uses peer data sequence 304 (or PDS data sequence number) to track data that peer nodes B, C, and D have sent out for synchronization. For example, data sequence number BCD is associated with the last data item received from peer node B. Data sequence number CDE is associated with the last data item received from peer node C. Data sequence number DEF is associated with the last data item received from peer node B. In various implementations, a given peer node sends back to the originator peer node an acknowledgment (ACK) message for each data item received. In some implementations, the ACK message is a part of part of all CCM messages.

In various implementations, data item 306 is the data that the peer node synchronizes with other peer nodes. As indicated above, data item 306 may be an update (e.g., MAC address change, etc.).

Figure 4:
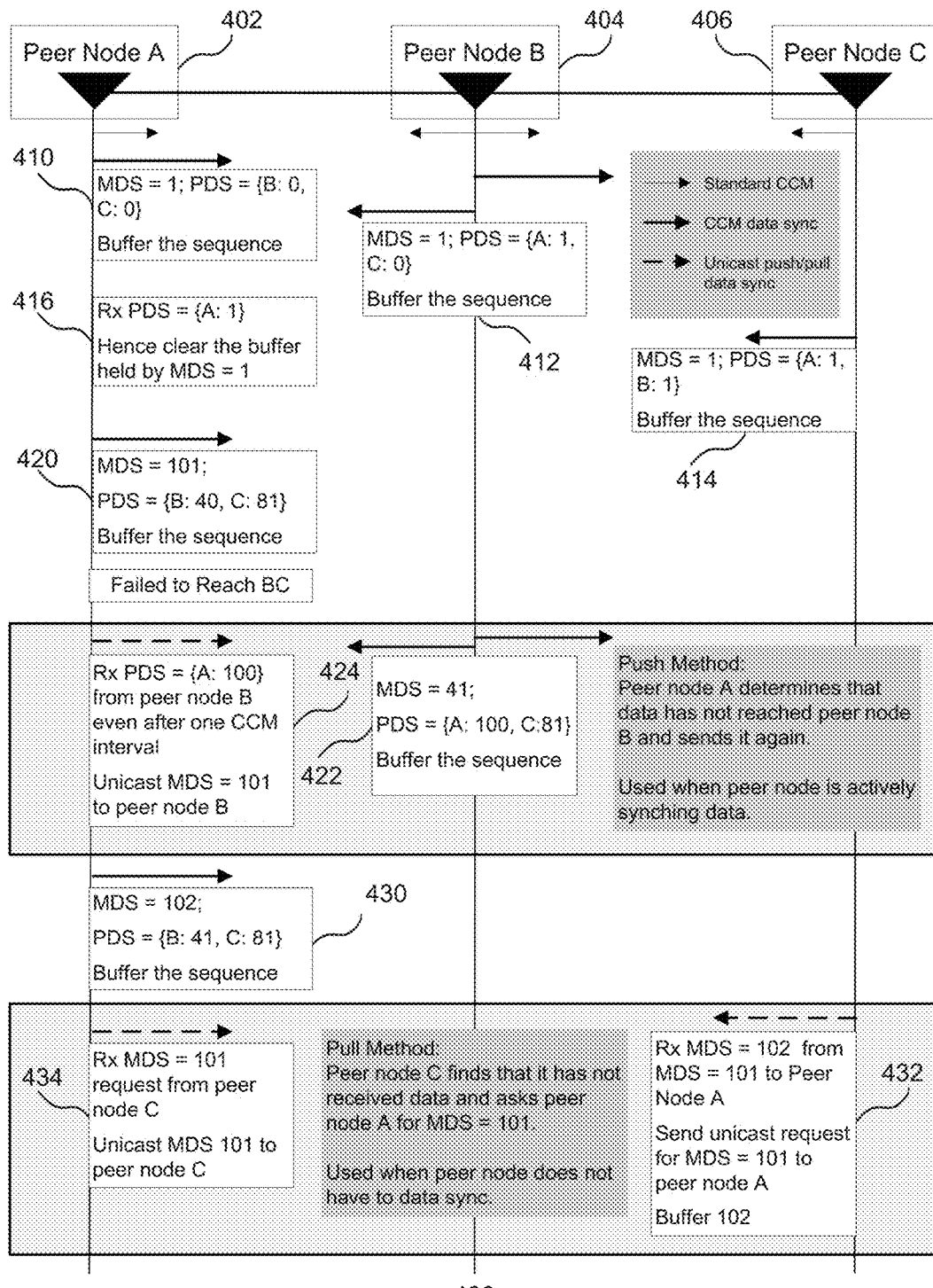
FIG. 4 illustrates an example simplified flow diagram for synchronizing peer nodes of a multi-chassis cluster in networks, according to some implementations.

FIG. 4 illustrates an example simplified flow diagram for synchronizing peer nodes of a multi-chassis cluster in networks, according to some implementations. As shown, a thin line is associated with a standard CCM health check message. In various implementations, standard CCM messages may be still be used to monitor the health of the cluster domain endpoints, at typical intervals (e.g., every 10 ms, 30 ms, etc.). As described in more detail herein, peer nodes may utilize CCM piggy-backed, cluster-synchronization communication to be sent out on a triggered basis, which also doubles up as a "liveliness" check. A thick line is associated with a CCM data synchronization involving TLVs described herein. A broken line is associated with unicast messages, where a unicast message may be related to a push or pull data synchronization. The inverted triangles indicate UP MEPs configured on peer-nodes, and the thick line connecting the peer nodes indicates logical IST connections in the peer cluster.

For ease of illustration, implementations are described herein in the context of three peer nodes. These implementations and others also apply to many peer nodes (e.g., 8, 16, etc.).

As described in more detail below, FIG. 4 involves a multi-chassis cluster with peer node A, peer node B, and peer node C. The first example involves peer node A being an originator node of messages. Other examples involve peer node B and peer node C being originator nodes of messages. Referring to block 410, peer node A has an update to synchronize with peer node B and peer node C. As shown, the data sequence number (or MDS data sequence number) that is associated with the update is MDS=1. At this point in time, peer node nodes B and C have no update. As such, the peer data sequence of peer node A (or PDS data sequence number) indicates that PDS={B:0, C:0}, as no updates have been received from peer nodes B or C. Peer node A sends out a data sequence number MDS=1 and associated data item. In various implementations, peer node A buffers the sequence until peer node A receives ACK messages from peer nodes B and C indicating that peer nodes B and C received the data item. After peer node A receives ACK messages from both peer nodes B and C, peer node A then clears its buffer.

At block 412, peer node B has an update to synchronize with peer nodes A and C, and generates a data sequence number MDS=1. Peer node B also receives the update from peer node A (e.g., MDS=1 from peer node A). At this point, peer node B has not received an update from peer node C. As such, the peer data sequence of peer node B indicates PDS={A:1, C:0}. For clarification, MDS=1 from peer node A and no update from peer node C corresponds to PDS={A: 1, C:0} of peer node B.

Peer node B sends out a data sequence number MDS=1 and the associated data item (update) to the other peer nodes A and C. Peer node B also sends an ACK message to peer node A confirming that peer node B received the data item (MDS=1) from peer node A. For example, in some implementations, peer node B may include a TLV that includes PDS={A: 1}. In various implementations, peer node B sends its update and any ACK indications in the same message. Peer node B buffers the sequence until peer node B receives an ACK message from peer nodes A and C indicating that peer nodes A and C received the data item from peer node B. After peer node B receives ACK messages from both peer nodes A and C, peer node B may then clear its buffer. At this point, at block 412, peer node A has received an ACK message from peer node B, but has not yet received an ACK message from peer node C.

At block 414, peer node C has an update to synchronize with peer nodes A and B, and generates a data sequence number MDS=1. As such, the peer data sequence of peer node C indicates PDS={A:1, B:1}. Peer node C sends out a data sequence number MDS=1 and associated data item to the other peer nodes. Peer node C also sends an ACK message to peer node A confirming that peer node C received the data item (MDS=1) from peer node A. Peer node C also sends an ACK message to peer node B confirming that peer node C received the data item (MDS=1) from peer node B. In various implementations, peer node C sends its update and any ACK indications in the same message. In other words, a single ACK message functions as an acknowledgement (e.g., ACK indication) for multiple peer nodes. In various implementations, peer node C acknowledges data synchronization messages from peer nodes A and B using the PDS TLV. The PDS TLV may have a sequence number 1 set for each of peer nodes A and B. Peer node C buffers the sequence until peer node C receives ACK messages from peer nodes A and B indicating that peer nodes A and B received the data item from peer node C. After peer node B receives ACK messages from both peer nodes A and C, peer node B may then clear its buffer.

In another scenario at a later time, peer node A has an update to synchronize with peer nodes B and C, and generates a data sequence number MDS=101. Note that this is the $101^{st}$ update in this example. As shown, the peer data sequence of peer node A indicates PDS={B:40, C:81}, where peer node A has detected 40 updates from peer node B, and 81 updates from peer node C. Peer node A sends out a data sequence number MDS=101 and associated data item to the other peer nodes. Peer node A also buffers the sequence and waits for ACK messages from peer nodes B and C. For the next description, assume that the data sequence number MDS=101 failed to reach peer nodes B and C.

At block 422, peer node B has an update with associated data sequence number MDS=41. Peer node B then sends out the update with associated data sequence number MDS=41 and ACK indications PDS={A:100, C:81} to both peer nodes A and C. Peer node A can now determine that peer node B is now at update 41, but peer node A also determines that peer node B last received the data item associated with data sequence number MDS=100 of peer node A. In some implementations, peer node A may wait a predetermined number of intervals (e.g., 1 or 2, etc.), before resending the data item associated with data sequence number MDS=101 to peer node B. Peer node A then resends the data item and associated data sequence number MDS=101 to peer node B. In various implementations, peer node A unicasts the data item and associated data sequence number MDS=101 to peer node B, not to peer node C.

In another scenario at a later time, at box 430, peer node A has an update to synchronize with peer nodes B and C, and generates a data sequence number MDS=102. As shown, the peer data sequence of peer node A indicates PDS={B:41, C:81}, where peer node A has detected 41 updates from peer node B and 81 updates from peer node C. Peer node A sends out a data sequence number MDS=102 and associated data item to the other peer nodes. Peer node A also buffers the sequence and waits for ACK messages from peer nodes B and C.

At box 432, peer node C receives the data item and associated data sequence number MDS=102 from peer node A. The peer data sequence of peer node C indicates PDS={A:100, B:41}, where peer node C has detected 100 updates from peer node A and 41 updates from peer node B. Peer node C receives MDS=102 before MDS=101, which informs peer node C that MDS=101 was lost. Accordingly, Peer C makes a request to peer node A for the data item associated with the data sequence number MDS=101, because MDS=102 arrived and MDS=101 did not arrive. In response to peer node A receiving the request, peer node A then resends the data item and associated data sequence number MDS=102 to peer node C. In various implementations, peer node A unicasts the data item and associated data sequence number MDS=101 to peer node C, not to peer node B. After peer node A receives ACK messages from both peer nodes B and C, peer node A may then clear its buffer.

Implementations described herein provide various benefits. For example, a CFM-based framework ensures deployment opportunities for both traditional (e.g., non-SPB-based clusters) and SPB-based clusters. Furthermore, a TLV-based framework provides scope for expansion and proprietary solutions. Furthermore, implementations provide frameworks that support cluster-synch across modules such as MacTable Synch, ArpTable Synch, IGMPTable Synch, etc. Implementations may also be used for event synchronization involving schedule events such as port-down events, timeout events, table-flush events, VLAN membership changes, etc. in order to achieve consistent states. Implementations provide incremental synchronization, which is especially suited for large, non-summarizable tables such as MAC tables/ internet group management protocol (IGMP) tables. Implementations also provide CFM operations, administration, and maintenance (OAM) functionality—CCM, LBM, LTM is an added benefit for the health-check, debugging/troubleshooting of the cluster.

Figure 5:
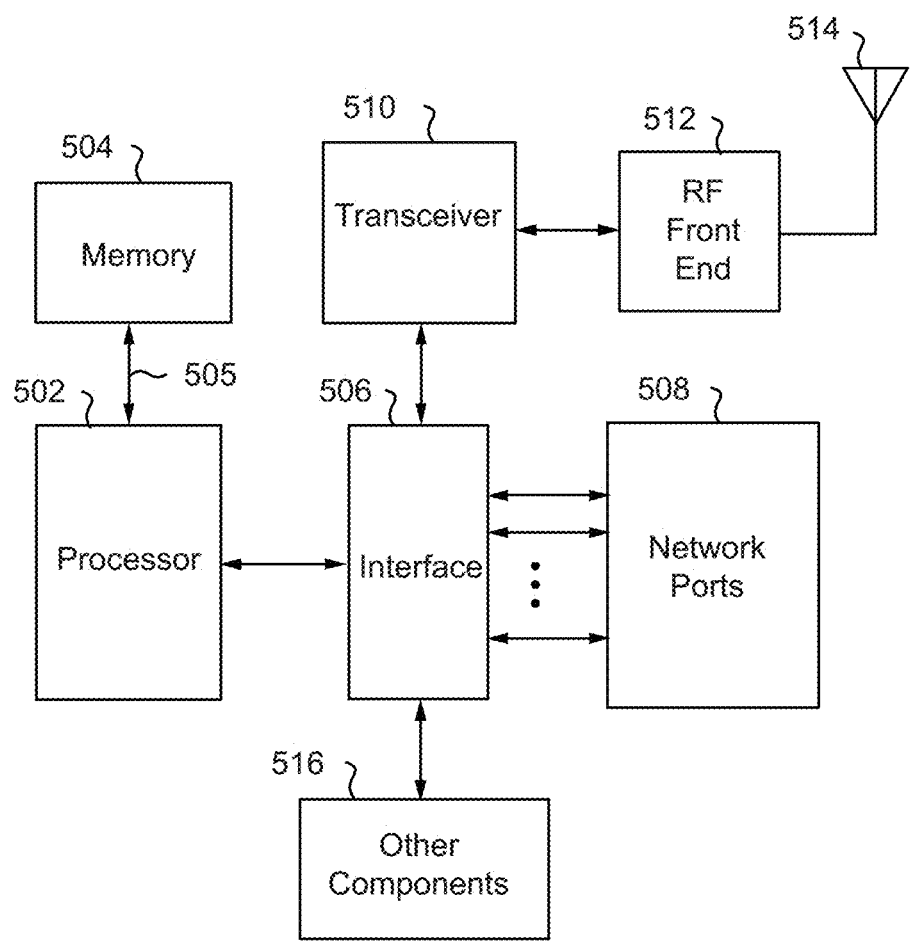
FIG. 5 illustrates a block diagram of an example device, which may be used to implement some implementations described herein.

FIG. 5 illustrates a block diagram of an example device, which may be used to implement some implementations described herein. Device 500 can be, for example, a wireless controller, a wireless access point, a switch, or any device that performs switching and achieves switching redundancy, etc. In a basic configuration, device 500 typically includes one or more processors 502 and a system memory 504. A memory bus 505 can be used for communicating between processor 502 and system memory 504.

Depending on the desired configuration, processor 502 can be of any type of processing circuitry including but not limited to one or more microprocessors, microcontrollers, digital signal processors (DSPs), application specific integrated circuits (ASICs), or any combination thereof. In some examples, processor 502 can include one or more levels of caching, a processor core, and registers. An example processor core can include an arithmetic logic unit (ALU), a floating point unit (FPU), a digital signal processing core (DSP), or any combination thereof. A memory controller can also be used with processor 502, or, in some implementations, a memory controller can be an internal part of processor 502.

System memory 504 can store data used in the operation of the device 500. For example, device 500 can be a wireless access controller and system memory 504 can store an operating system for the controller, one or more applications for the controller, and program data. In some implementations, the memory 504 can store software operative to perform network device functionality as well as read the instructions sent by an administrator or other user to the device and perform other functions as described above, including reading and executing commands and parameters, receiving information from associated wireless access points, and performing blocks of methods described herein using one or more processors. For example, access point profiles providing configurations for wireless access points, and/or software images and/or parameters for sending to be installed on access points, can be stored in memory 504. Furthermore, a signal coverage map can be stored in memory 504 representing the wireless coverage of associated wireless access points in the network, and/or all access points in the network. Alternatively, the software can be implemented as hardware or a combination of hardware and software. Memory 504 can be implemented as one or more of various types, volatile and/or non-volatile, including RAM, ROM, EEPROM, flash memory or other memory technology, etc.

An interface 506 can be used to interface the processor 502 with other functional components of the device 500. Such other components can include network ports 508 of the device 500 which are connected to other devices on the network to allow communication of data to and from other network devices. For example, Ethernet, Universal Serial Bus (USB), or other types of ports can allow wired network communication to the device 500. A transceiver 510 can be connected to interface 506 to allow transmission and reception of wireless signals at the device 500. For example, an RF front end 512 and antenna 514 can allow transmission and reception of wireless RF signals, as well as conversion between analog signals used in the wireless communication and digital signals used by the device 500. Signals of other frequencies can be communicated in other implementations.

Additional components 516 can also be connected to interface 506. For example, storage devices can be connected to the interface 506, such as CD-ROM, DVD, or other optical storage, magnetic tape storage, magnetic disk storage or other magnetic storage devices, solid state memory storage, or any other medium which can be used to store the desired information and which can be accessed by device 500. Any such computer storage media (including memory 504) can be part of or accessible by device 500. Example computer storage media can include volatile and nonvolatile, removable and non-removable media implemented in any method or technology for storage of information, such as computer readable instructions, data structures, program modules, or other data.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

In general, it should be understood that the circuits described herein may be implemented in hardware using integrated circuit development technologies, or via some other methods, or the combination of hardware and software that could be ordered, parameterized, and connected in a software environment to implement different functions described herein. For example, the embodiments may be implemented using a general purpose or dedicated processor running a software application through volatile or non-volatile memory. Also, the hardware elements may communicate using electrical signals, with states of the electrical signals representing different data. It should be further understood that this and other arrangements described herein are for the purposes of example only. As such, those skilled in the art will appreciate that other arrangements and other elements (e.g., machines, interfaces, functions, orderings, and groupings of functions, etc.) may be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural terms and/or singular term herein, those having ordinary skill in the art can translate from the plural to the singular and/or from the singular to the plural as is appropriate to the context and/or application. The various singular/plural permutations may be expressly set forth herein for sake of clarity.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those skilled in the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those of ordinary skill in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense that one having ordinary skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Any suitable programming language may be used to implement the routines of particular embodiments including C, C++, Java, assembly language, etc. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

Particular embodiments may be implemented in a computer-readable storage medium (also referred to as a machine-readable storage medium) for use by or in connection with an instruction execution system, apparatus, system, or device. Particular embodiments may be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms. In general, the functions of particular embodiments may be achieved by any means known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that is stored in a machine-readable medium to permit a computer to perform any of the methods described above.

While one or more implementations have been described by way of example and in terms of the specific embodiments, it is to be understood that the implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A method, comprising:
generating a data sequence number associated with a data item, wherein the data item relates to a network update to a plurality of peer nodes;
sending, using multicast, a message to the plurality of peer nodes, wherein the message comprises the network update, the data sequence number, and peer data sequence numbers, wherein each peer data sequence number is associated with a peer node of the plurality of peer nodes, and wherein the message is an update message and an acknowledgement message to the plurality of peer nodes;
determining, for each peer node of the plurality of peer nodes, whether an acknowledgment has been received by reading the peer data sequence numbers within the message, wherein the acknowledgment indicates a peer node that sent the acknowledgment and indicates the data sequence number; and
resending, using unicast, the network update and the data sequence number to each peer node of the plurality of peer nodes for which an acknowledgement is determined to not have been received.

2. The method of claim 1, wherein the sending the message is based on a connectivity fault management protocol.

3. The method of claim 1, wherein the resending the network update is based on a predetermined policy that comprises resending the data item and the data sequence number in response to an acknowledgment not being received within a predetermined time period.

4. The method of claim 1, wherein the resending the network update is based on a predetermined policy that comprises resending the data item and the data sequence number in response to receiving a request for the data item.

5. The method of claim 1, further comprising generating a list of a latest data sequence number for each peer node.

6. The method of claim 1, further comprising:
buffering the data item and the data sequence number; and
clearing the data item and data sequence number in response to each peer node receiving the data item.

7. The method of claim 1, wherein the sending the message is a part of a synchronization process.

8. The method of claim 1, wherein the message comprises a continuity check message (CCM) message, and wherein the data sequence number is different from a CCM message sequence number.

9. The method of claim 1, wherein the network update, the data sequence number, and the peer data sequence number are encoded in a type-length-value (TLV) format.

10. The method of claim 1, wherein the resending the network update is based on a loop back messaging (LBM) unicast capability of each of the plurality of peer nodes.

11. A computer program product comprising a non-transitory computer-readable medium including program instructions to be implemented by a device connected to a communication network, the program instructions for:
generating a data sequence number;
associating the data sequence number with a data item, wherein the data item relates to a network update to a plurality of peer nodes;
sending, using multicast, a message to the plurality of peer nodes, wherein the message comprises the network update, the data sequence number, and peer data sequence numbers, wherein each peer data sequence number is associated with a peer node of the plurality of peer nodes, and wherein the message is an update message and an acknowledgement message to the plurality of peer nodes;
determining, for each peer node of the plurality of peer nodes, whether an acknowledgment has been received by reading the peer data sequence numbers within the message, wherein the acknowledgment indicates a peer node that sent the acknowledgment and indicates the data sequence number; and
resending, using unicast, the network update and the data sequence number to each peer node of the plurality of peer nodes for which an acknowledgement is determined to not have been received.

12. The computer program product of claim 11, wherein the sending the message is based on a connectivity fault management protocol.

13. The computer program product of claim 11, wherein the resending the network update is based on a predetermined policy that comprises resending the data item and the data sequence number in response to an acknowledgment not being received within a predetermined time period.

14. The computer program product of claim 11, wherein the resending the network update is based on a predetermined policy that comprises resending the data item and the data sequence number in response to receiving a request for the data item.

15. The computer program product of claim 11, wherein the program instructions further comprise generating a list of a latest data sequence number for each peer node.

16. A device comprising:
a memory; and
at least one processor operative to access the memory and perform operations comprising:
generating a data sequence number;
associating the data sequence number with a data item, wherein the data item relates to a network update to a plurality of peer nodes;
sending, using multicast, a message to the plurality of peer nodes, wherein the message comprises the network update, the data sequence number, and peer data sequence numbers, wherein each peer data sequence number is associated with a peer node of the plurality of peer nodes, and wherein the message is an update message and an acknowledgement message to the plurality of peer nodes;
determining, for each peer node of the plurality of peer nodes, whether an acknowledgment has been received by reading the peer data sequence numbers within the message, wherein the acknowledgment indicates a peer node that sent the acknowledgment and indicates the data sequence number; and
resending, using unicast, the network update and the data sequence number to each peer node of the plurality of peer nodes for which an acknowledgement is determined to not have been received.

17. The device of claim 16, wherein the message comprises a continuity check message (CCM) message, and wherein the data sequence number is different from a CCM message sequence number.

18. The device of claim 16, wherein the sending the message is based on a connectivity fault management protocol.

19. The device of claim 16, wherein the resending the network update is based on a predetermined policy that comprises resending the data item and the data sequence number in response to an acknowledgment not being received within a predetermined time period.

20. The device of claim 16, wherein the resending the network update is based on a predetermined policy that comprises resending the data item and the data sequence number in response to receiving a request for the data item.

\* \* \* \* \*